Dec. 27, 1960 A. G. LAMBERT, JR 2,966,222
APPARATUS FOR MOVING AIRCRAFT OVER THE GROUND
Filed Sept. 5, 1956 7 Sheets-Sheet 2

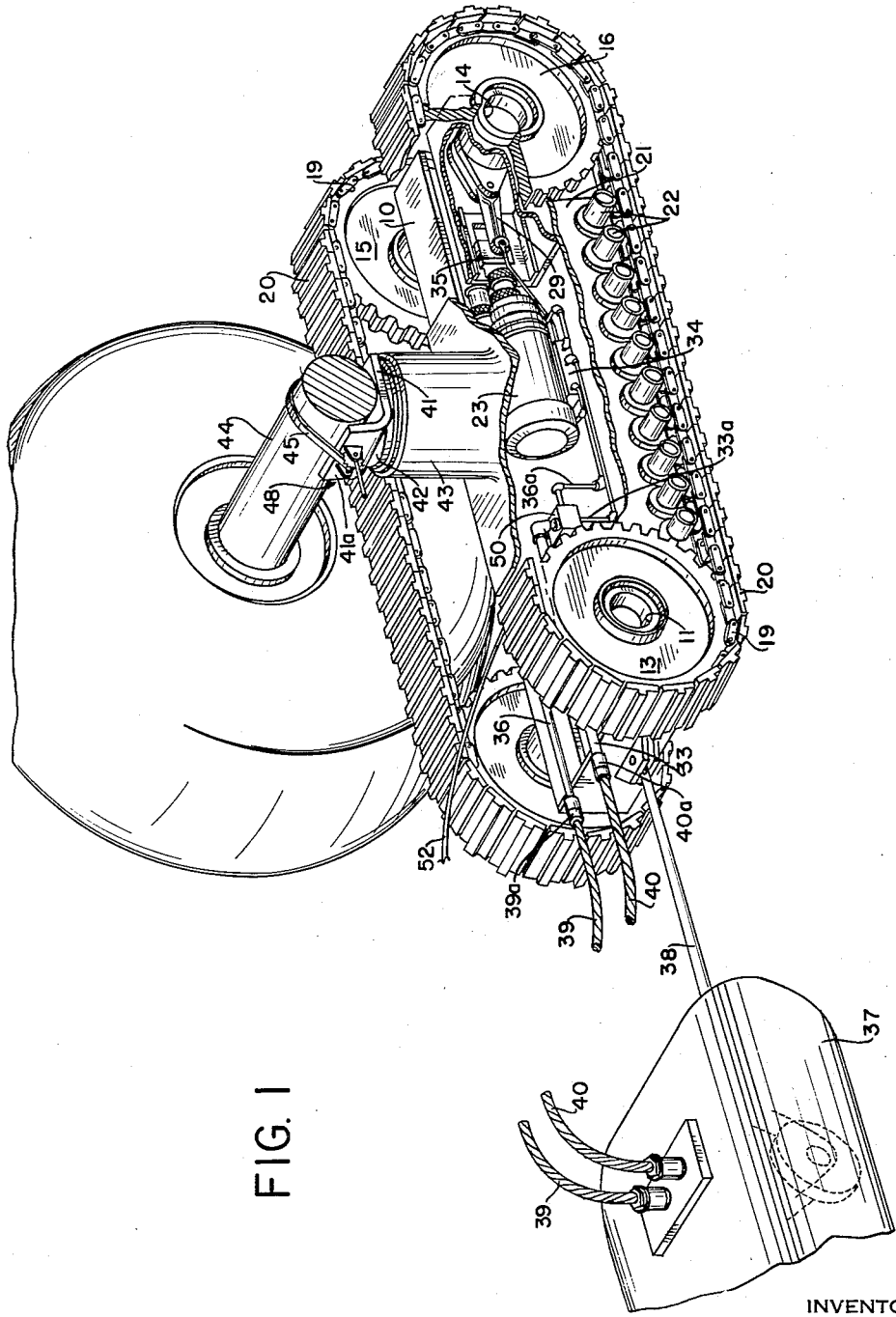

INVENTOR
ALFRED GAREY LAMBERT JR.
BY
Julian C. Renfro
ATTORNEY

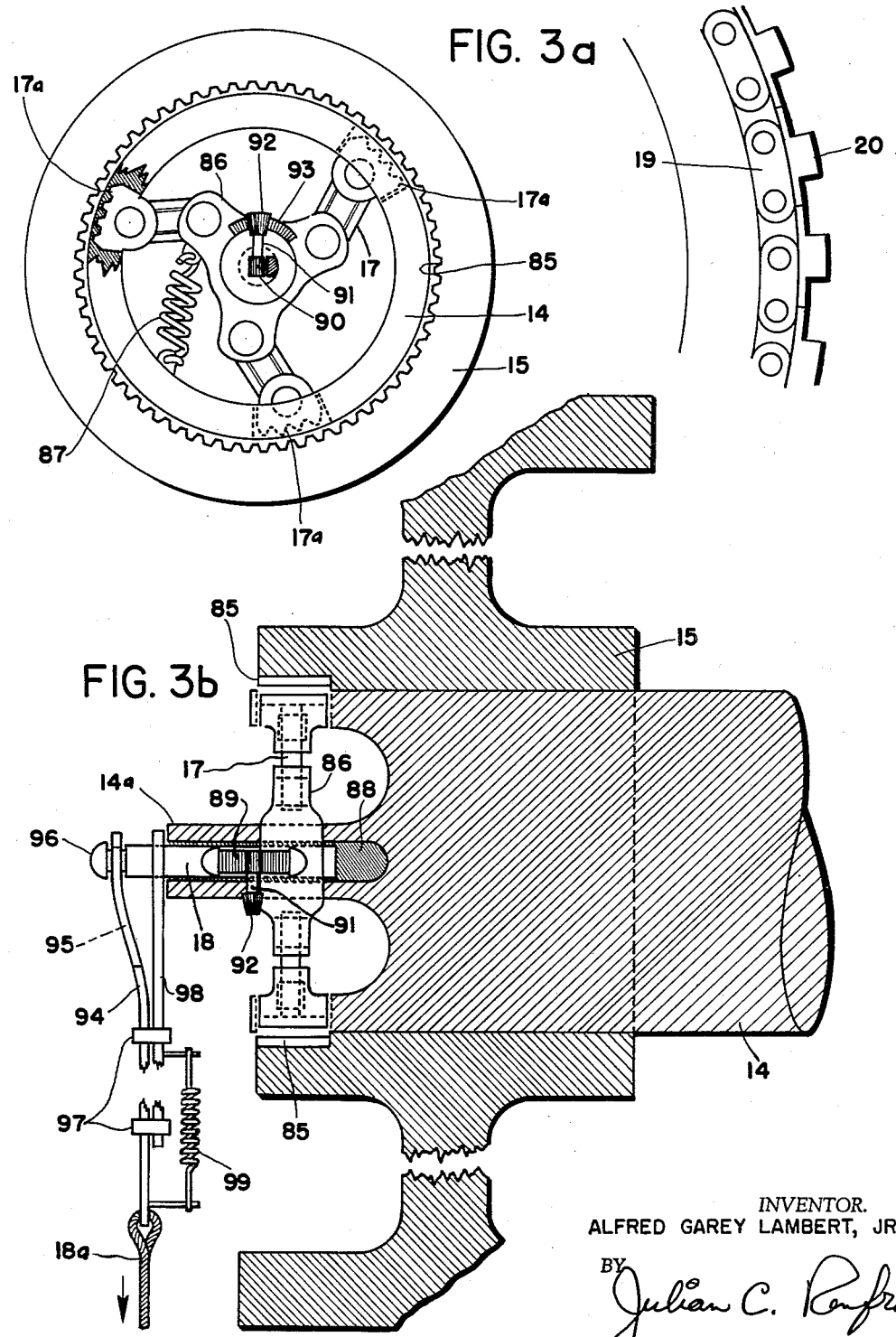

Dec. 27, 1960  A. G. LAMBERT, JR  2,966,222
APPARATUS FOR MOVING AIRCRAFT OVER THE GROUND
Filed Sept. 5, 1956  7 Sheets-Sheet 4

INVENTOR
ALFRED GAREY LAMBERT JR.
BY
Julian C. Renfro
ATTORNEY

Dec. 27, 1960     A. G. LAMBERT, JR     2,966,222
APPARATUS FOR MOVING AIRCRAFT OVER THE GROUND
Filed Sept. 5, 1956     7 Sheets-Sheet 6

INVENTOR
ALFRED GAREY LAMBERT JR.
BY
Julian C. Renfro
ATTORNEY

Dec. 27, 1960 A. G. LAMBERT, JR 2,966,222
APPARATUS FOR MOVING AIRCRAFT OVER THE GROUND
Filed Sept. 5, 1956 7 Sheets-Sheet 7

INVENTOR
ALFRED GAREY LAMBERT JR.
BY
Julian C. Renfro
ATTORNEY

United States Patent Office 2,966,222
Patented Dec. 27, 1960

2,966,222

APPARATUS FOR MOVING AIRCRAFT OVER THE GROUND

Alfred Garey Lambert, Jr., Baltimore, Md., assignor to The Martin Company, a corporation of Maryland Filed Sept. 5, 1956, Ser. No. 608,116

1 Claim. (Cl. 180—6.7)

The present invention relates to the moving of aircraft and like heavy vehicles over the ground. More particularly, the invention is directed to a novel apparatus which is light and compact, yet adapted to move aircraft of large size and relatively great weight, and to a novel method of moving an aircraft with such apparatus. The invention is especially adapted for, but not restricted to, the moving of heavy jet aircraft on the ground.

In connection with the moving of large jet aircraft on the ground, it is often impractical to use the jet motors. Taxiing is uneconomical, due to high fuel consumption; hot exhaust gases may damage nearby aircraft and maintenance equipment; and frequently, during performance of maintenance, the main power plants are not available to furnish power for taxiing. Accordingly, it has been common practice, in the past, to utilize tractors or tugs to tow the aircraft from place to place. The use of conventional towing vehicles is, however, subject to the great disadvantage that the tractor must have a weight equal to almost half the weight of the aircraft, in order to have sufficient tractor to tow the aircraft at practical speeds over sloping ground surfaces. The weight requirements for such towing vehicles, of course, become excessive where heavy military or commercial aircraft are involved, so that the use of conventional towing vehicles presents difficulties.

The present invention overcomes the problems encountered with the use of conventional towing vehicles by providing a novel and improved mover which is highly compact and weighs only a small fraction of the weight of conventional towing vehicles.

More specifically, the invention provides a novel moving apparatus which is arranged so that the weight of the aircraft itself is utilized to provide the traction necessary for moving the aircraft. The new mover provides sufficient motive power for exerting the required tractive effort, while a portion of the weight of the aircraft is used to obtain traction with the ground. An apparatus of the improved type, weighing less than 500 pounds, is capable of moving an aircraft weighing as much as 100,000 pounds. A conventional towing vehicle, of equivalent capacity, would be required to have a weight of about 45,000 pounds, assuming a coefficient of rolling friction of 0.030 and a coefficient of sliding friction of 0.30, with an expected maximum grade of 10 percent.

In the basic form of the invention, the mover includes powered traction elements, preferably of the crawler type, in combination with means to transfer a portion of the weight of the aircraft onto the traction elements. Thus, while the complete mover has very little weight itself, such additional weight is applied thereto during moving as may be necessary to effect the required frictional engagement between the traction elements and the ground.

The preferred form of the mover comprises a frame having spaced crawler type traction elements at each side. The traction elements are driven through power transfer means carried by the frame, and are adapted for independent actuation whereby the mover may be easily maneuvered into place with respect to an aircraft. The mover is engaged with the landing gear of an aircraft, and has means adapted to exert an upward force upon the landing gear whereby a portion of the weight supported by the aircraft wheels is transferred to the traction elements of the mover.

In accordance with the method of the invention, an aircraft of the type having landing gear spaced on opposite sides of the fuselage may be efficiently moved by positioning a mover by each landing gear and supporting a portion of the aircraft weight on each mover. The separate movers or drivers are then driven under independent control, so that the aircraft may be maneuvered by controlling the relative driving speeds of the movers.

In another form of the invention, the mover includes power means with detachable means in combination, for applying the power to the wheels of an aircraft. In this form of the invention, power for moving is applied through the wheels of the aircraft, utilizing, for traction, that portion of the weight of the aircraft supported by the driven wheel or wheels.

In all forms, the invention is characterized not only by compactness and lightness in weight, but by simplicity of design, providing economy in maintenance and ease in replacement of parts under field conditions.

For a better understanding of the invention, reference may be made to the following detailed description and accompanying drawings, in which:

Fig. 1 is a perspective view, with parts broken away, of a preferred form of the mover of the invention;

Figure 3a is a side elevational view of one of the driving wheels to a substantially larger scale, revealing certain details associated with the retractable pins utilized for engaging or disengaging the driving wheels from the crankshaft;

Figure 3b is a cross sectional view of a driving wheel revealing details associated with the control shaft used for manipulating the retractable pins;

Figure 3:
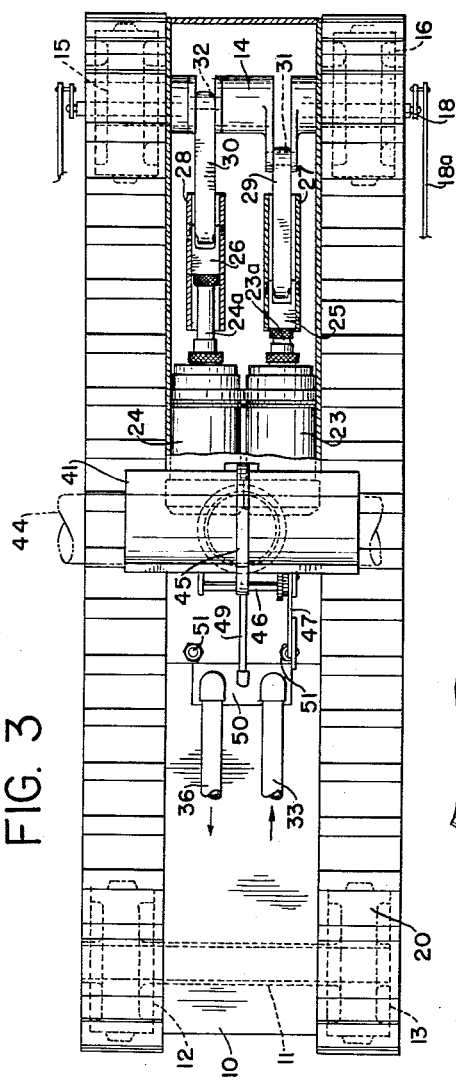
Fig. 3 is a top plan view of the mover of Fig. 1, with parts broken away.
Figure 2:
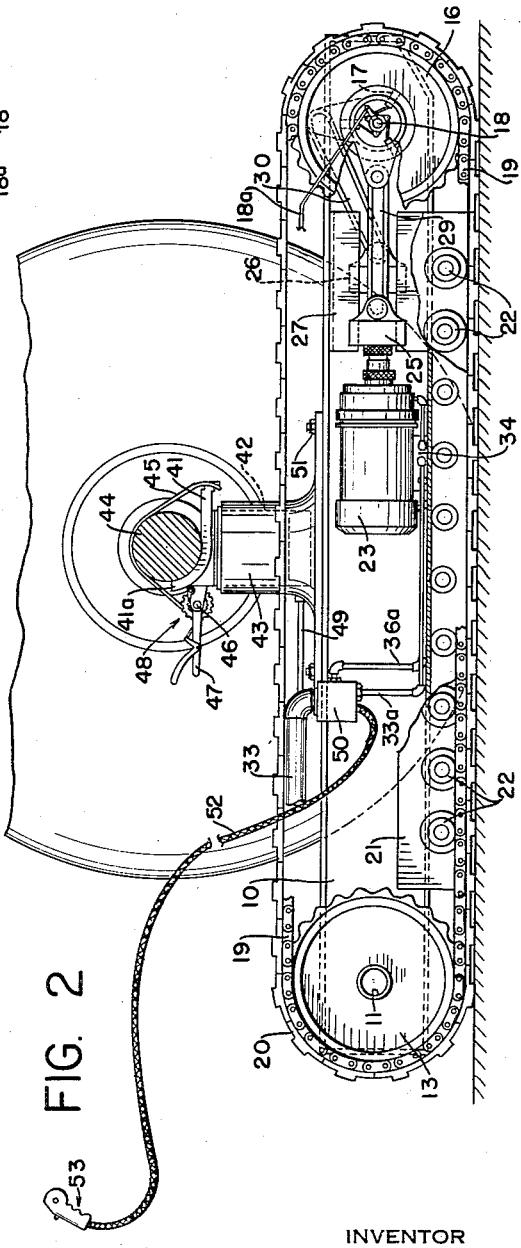
Fig. 2 is a side elevation of the mover of Fig. 1, with parts broken away.

Referring initially to Figs. 1–3, the preferred embodiment of the mover comprises a frame 10 formed of elongated horizontally disposed structural members. At one end of the frame 10, i.e., the left-hand end, there is provided a transversely extending axle 11 which projects outwardly at each side of the frame and mounts sprocket wheels 12, 13 for rotation with respect to the frame. At the opposite end of the frame 10 is journaled a crank shaft 14, having portions extending outwardly of each side of the frame and mounting sprocket wheels 15, 16. The wheels 15, 16 are normally loosely mounted on the crank shaft 14, and are adapted to be drivingly connected thereto by means of retractable pins 17 (Fig. 2). The pins 17 may be selectively moved into positions for engaging or releasing the wheels 15, 16 by means of axially slidable control shafts 18. A separate control shaft is provided for each of the wheels 15, 16 so that the wheels may be separately and independently engaged in driving relation with the crank shaft 14 to provide means for steering the device, i.e., differential operation of the tractive elements.

Each of the control shafts 18 is connected to a control cable 18a, by means of which the control shafts may be independently manipulated from a remote position. The cables 18a may be manipulated manually, or by suitable electrical or fluid actuated devices, as will be understood.

As seen in more detail in Figures 3a and 3b, the pins 17 of each driving wheel may each include a radially movable gear sector having teeth 17a designed to engage internal teeth 85 disposed about the inner periphery of the hub of each wheel, in this case wheel 15. The movements of these pins is directly controlled by the rotative positioning of a clutching plate 86, which is relatively rotatable to a limited extent with respect to crank shaft 14, being rotatably mounted upon a crank shaft extension 14a. Pins 17 are pivotally mounted about the periphery of the clutching plate 86, and their position directly controls the position of the gear teeth 17a. Clutching plate 86 is normally biased by spring 87 in the counterclockwise direction as viewed in Figure 3a, although in this figure the clutching plate has been moved to the non-engaging position. The effect of spring 87 is to bias the gear sectors into engagement with the internal teeth of the hub of the wheel, so that driving effort applied to the crank shaft may be transmitted to the wheels.

The control shafts of the wheels 15 and 16 are operative to bring about steering of the vehicle, the control shaft 18 of wheel 15 being revealed in Figure 3b to be mounted in a recess 88 in the extension 14a, so as to be axially movable. Disposed on shaft 18 is a rack 89, in meshing engagement with which is a pinion 90 mounted upon a shaft 91. On the opposite end of shaft 91 is a second pinion 92 meshing with a gear sector 93 of the clutching plate, so by the rotation of pinion 90 as a result of axial movement of shaft 18, the pinion 92 is caused to simultaneously rotate and bring about several degrees of rotation of clutching plate 86 relative to axle 14, thereby to cause radial movement of the pins 17 and subsequent engagement or disengagement of the axle from the wheel.

A slotted sliding bar 94 is arranged to move the shaft 18 in accordance with movements of the control cable 18a. A slot 95 in the end of bar 94 remote from the attachment point of cable 18a slidably receives a headed end 96 of shaft 18, and because of the angularity of bar 94, as the bar is caused to slide in brackets 97 disposed on mounting bar 98 that is freely disposed upon shaft 18, the shaft 18 is caused to move axially. I prefer to have the pins 17 normally biased to the engaging position, with disengagement obtained by pull exerted upon cable 18a, although the reverse type of action could be obtained if desired. Tension spring 99 may be employed to facilitate the return of slider bar 94 to the position allowing the shaft 18 to be disposed in the position to bring about the application of tractive effort to the wheels.

As shown in Fig. 3, the sprocket wheels 12, 15 are longitudinally aligned, as are the wheels 13, 16. Entrained about each of the pairs of aligned wheels are driving chains 19 which are adapted to be driven by rotation of the driving wheels 15, 16. The chains 19 may be of a more or less conventional type, and are adapted to support driving elements 20 forming a substantially continuous band about the outside of each chain. The chains 19 and driving elements 20 form crawler type tractive elements, as is readily apparent in Fig. 1. The tractive elements may also be in the form of endless rubber treads, for example, or such elements as Rolligons may be employed in appropriate cases. The name Rolligon is a trademark of the Goodyear Tire and Rubber Company, Inc. of Akron, Ohio.

At the opposite sides of the frame 10 are secured vertically disposed plates 21, which extend longitudinally along the lower reach of the tractive elements 19—20. The plates 21 mount a plurality of longitudinally spaced flanged rollers 22 which are adapted to bear upon the exposed lower reaches of the chains 19 to provide support between the frame 10 and chains 19 between the front and rear sprocket wheels.

For driving the traction elements or tracks 19—20, hydraulic cylinders 23, 24 are rigidly mounted on the frame 10, in side-by-side relation, and are connected in driving relation to the crank shaft 14. As shown in Figs. 2 and 3, the piston rods 23a, 24a, of the respective fluid cylinders 23, 24 mount cross-heads 25, 26 at their forward ends. The cross-heads 25, 26 are guided for longitudinal movement by suitable slides 27, 28. Connected to the cross-heads 25, 26 are connecting rods 29, 30, respectively, which are attached to crank pins 31, 32 of the crank shaft 14. As shown in Fig. 2, the crank pins 31, 32 are offset approximately 90 degrees about the crank shaft 14 so that when one of the cranks is in dead-center position the other will be in driving position.

In accordance with the invention, the hydraulic power cylinders 23, 24 are adapted to be actuated in a manner similar to the actuation of conventional steam cylinders. Thus, a constant supply of hydraulic fluid is provided through an inlet conduit 33 leading through a master control valve 50 and conduits 33a to sequencing valves 34 for each of the driving cylinders 23, 24. The sequencing valves 34 direct the pressure fluid into one end or the other of the respective cylinders 23, 24 so that the piston rods 23a, 24a, are reciprocated in the desired manner. The sequencing valves 34 may be actuated by suitable cams or linkages 35 (Fig. 1) so that when the piston rod of either cylinder reaches the end of its stroke, the fluid flow into that cylinder is directed to the opposite end thereof to reverse the application of power. Exhaust fluid is controlled in the same manner, and is discharged through conduits 36a, master valve 50 and main exhaust conduit 36.

As will be understood, the driving cylinders 23, 24 may be replaced by suitable rotary hydraulic motors, pneumatic turbines, electric motors or the like. The cylinders 23, 24 are merely exemplary and do not limit the scope of the invention in any respect.

Figure 7:
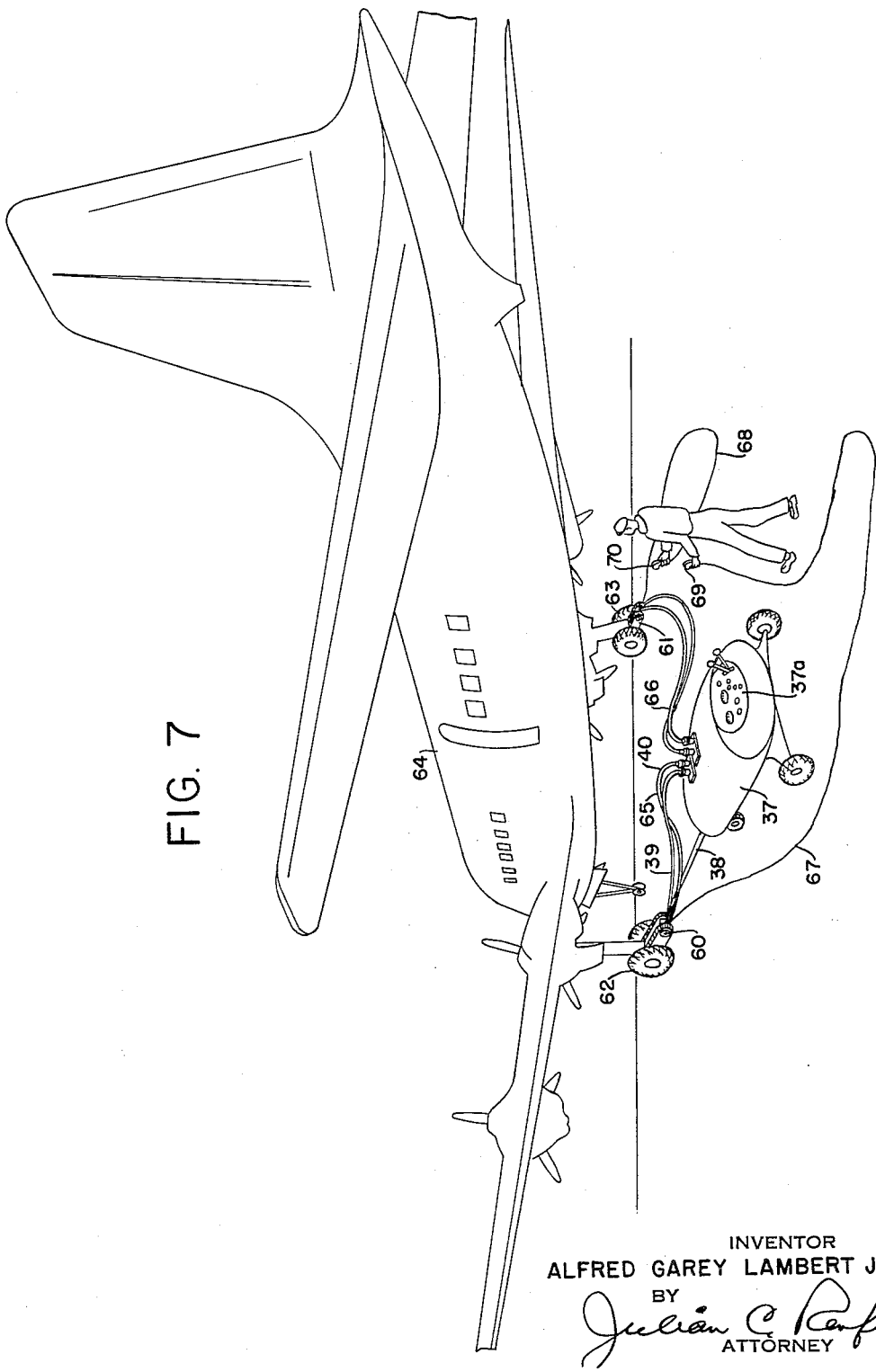
Fig. 7 is a perspective view illustrating the method of moving and maneuvering a large aircraft in accordance with the invention.

To supply motive power to the mover of Figs. 1–3, an auxiliary vehicle 37 may be advantageously employed. The auxiliary vehicle 37 may be in the form of a trailer connected to the frame 10 of the mover by a drawbar 38, substantially as shown in Figs. 1 and 7. The trailer 37 carries a suitable engine and hydraulic pump means (not shown) and is detachably connected to the main supply and exhaust conduits 33, 36 of the mover through flexible lines 39, 40. Any of various types of engines and pump means may be utilized, if pressure and volume capacity is sufficient. By way of example and not as a limitation, the engine may be a combustion turbine or aircraft type piston engine, steam engine, electric motor, etc.

In accordance with the invention, the mover is attached to an aircraft or other vehicle to be moved by means of a shoe 41 carried by the movable member 42 of a powerful hydraulic actuator 43. The shoe 41 is advantageously in the form of a plate having its back edge 41a bent upwardly in arcuate form. The shoe is adapted to be placed in engagement with the cylindrical axle 44 of an aircraft landing gear, for example. The upwardly bent portion 41a of the shoe engages back surface portions of the axle 44 and facilitates the application of forward longitudinal forces thereto. The shoe 41 is detachable to permit substitution of shoes of different configuration to accommodate a wide variety of aircraft and other vehicles.

To secure the shoe 41 and axle 44 together, a flexible band 45 is secured to a front edge portion of the shoe and adapted to be wrapped about a spindle 46 adjacent the rear edge of the shoe. The spindle 46 is adapted to be rotated by means of a lever 47 to draw the flexible band 45 tightly against the axle 44. A suitable ratchet mechanism, generally designated by the numeral 48, is provided to maintain the tension on the band 45 until the shoe 41 is intentionally disengaged from the axle 44. The band 45 is used primarily to secure the mover and aircraft together during times when moving force is being applied to the aircraft.

As stated heretofore, in order for a conventional towing vehicle to have sufficient tractive engagement with the ground surface to move a large aircraft, the conventional towing vehicle must have a weight equal to almost half that of the aircraft or other vehicle to be moved. This is necessary in view of the force necessary to move the aircraft at a practical speed (2½–5 m.p.h.) over runways and other surface areas, assuming a maximum grade of 10 percent and coefficients of rolling and sliding friction of 0.030 and 0.30, respectively. It is contemplated that the mover of the present invention will have weight not to exceed 500 pounds. Accordingly, to obtain the necessary tractive engagement between the treads 19—20 and the ground surface, the aircraft-engaging pad 41 may be pressed upwardly with substantial force by the hydraulic actuator 43 in order to transfer a portion of the weight of the aircraft onto the mover itself. The actuator 43 is supplied with hydraulic fluid through a conduit 49 connecting the main inlet and outlet conduits 33, 36 through the master valve 50. When the mover is brought into position, with the aircraft-engaging pad 41 directly beneath the axle 44, fluid is directed into the lower end of the actuator 43, through the conduit 49, to raise the movable element 42 of the actuator and carry the pad 41 into pressure engagement with the axle 44. As shown in Fig. 1, the actuator 43 is secured directly to the frame 10 by means of bolts 51, for example, so that the upward force exerted by the actuator 43 reacts downwardly on the frame 10 and presses the treads 19—20 into firm engagement with the ground surface.

To use the mover of Figs. 1–3, the auxiliary vehicle 37 is first attached to the mover and the flexible hydraulic lines 39, 40 are connected to the exhaust and inlet conduits 36, 33, respectively, of the mover by means of suitable connectors or couplers 39a, 40a. The auxiliary vehicle 37 may have a seat, not shown, upon which the operator may ride, and is provided with suitable controls 37a (Fig. 7) for operating the engine and pump means.

For moving an aircraft of the type having a single primary landing gear located on the center line of the aircraft, only one mover will be employed.

When the auxiliary vehicle is attached to the mover, and the engine and pump are operating, the mover is energized by actuating the master control valve 50. This is accomplished by means of a remote control system, permitting the aircraft pilot, or an operator riding on the auxiliary vehicle or walking along with the mover, to selectively energize and control the driving treads of the mover.

Figure 5:
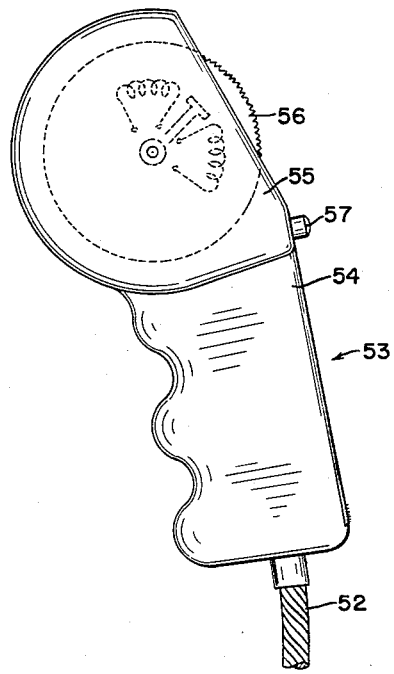
Fig. 5 is a side elevation of a manually gripped control device which may be used with the new mover.

For controlling the operation of the mover, an elongated flexible control line 52 is connected to the master valve 50 and trails behind the mover. At the end of the control line 52 is a manually gripped portable control device 53 (Figs. 5 and 6) by means of which the master valve 50 may be controlled. The illustrated control device 53 comprises a handle portion 54, shaped to fit the hand comfortably, and an enlarged housing 55 enclosing electrical control switches, etc. The housing 55 mounts a relatively large disc 56, which is adapted for rotation and has a serrated periphery. A portion of the disc 56 projects from the housing 55 and is adapted to be engaged by the thumb, whereby the disc may be manually rotated.

Figure 6:
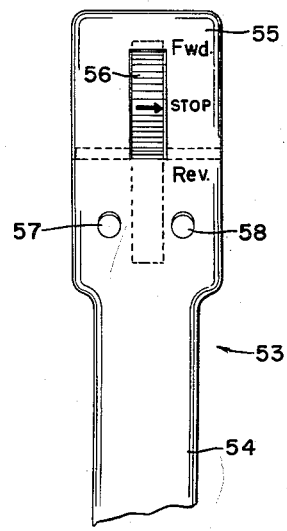
Fig. 6 is a fragmentary front elevation of the control device of Fig. 5.

As indicated in Fig. 6, the disc 56 may be rotated in one direction from a neutral point to cause the mover to travel forwardly, and in the opposite direction to cause the mover to move rearwardly. The speed of travel of the mover is determined by the rotational displacement of the disc 56 from a neutral point.

For maneuvering the mover into position, the control device 53 is provided with a pair of clutch control buttons 57, 58, by means of which the clutch control cables 18a may be actuated to selectively stall the driving treads of the mover.

It is of course contemplated that many arrangements may be provided for controlling the operation of the mover, the specific arrangement herein described being illustrative only.

When the mover is manipulated into a position where the pad 41 lies directly below the axle 44 of the aircraft landing gear, the band 45 is secured about the axle 44 to hold the pad 41 in place on the axle 44. The actuator 43 is then energized, urging the pad 41 upwardly into forceful engagement with the axle 44. This transfers a large portion of the weight supported by the axle 44 directly onto the treads 19—20 of the mover so that the treads are pressed firmly into engagement with the ground surface. The actuator 43 may be energized from the mover, or by means of the portable control device 53, as may be desired.

When the aircraft and mover are properly secured together, with a substantial portion of the weight of the aircraft resting directly upon the mover, the control device 53 is manipulated to energize the main driving actuators 23, 24 and drive the sprockets 15, 16 in a forwardly direction. A relatively constant driving force is applied to the sprockets 15, 16 through the offset crank pins 31, 32, the pins being arranged so that the effective crank arm of one pin is increasing while the effective crank arm of the other is decreasing.

As a general rule, the aircraft will be steered by means of its own landing gear while being moved. However, it is contemplated that in appropriate cases the aircraft may be steered by selective application of driving force to the spaced treads 19—20. Control of the mover may be effected from the cockpit of the aircraft or from the ground, as may be desired.

When the aircraft is manipulated into the desired position, the auxiliary vehicle or trailer 37 may be detached therefrom and taken away for use with another mover. The mover itself may remain attached to the aircraft for subsequent use, as will be readily apparent.

A mover of the type shown in Figs. 1–3, weighing approximately 250 pounds, and provided with main driving actuators capable of transmitting approximately 90 h.p., can move an aircraft weighing as much as 100,000 pounds up a 10 percent grade at a speed of about 2½ miles per hour. The frictional contact between the treads of the mover and the ground must in this case be such as to provide approximately 13,000 pounds of tractive effort. This requires that the treads of the mover support approximately 45,000 pounds, and, accordingly, the actuator 43 is of sufficient capacity to exert an upward force of 45,000 pounds upon the aircraft.

If the aircraft to be moved is of the type having landing gear spaced on opposite sides of its fuselage, a pair of movers may be employed, one for each landing gear. This arrangement is shown in Fig. 7, wherein movers 60, 61 are operatively positioned with respect to the spaced landing gear 62, 63 of an aircraft 64. A single auxiliary vehicle 37 is provided, and this is attached by means of its drawbar 38 to one of the movers. In accordance with the invention, both of the movers 60, 61 are operatively connected with the pump means of the auxiliary vehicle, through pairs of hydraulic lines 65, 66. The movers 60, 61 have elongated control lines 67, 68 trailing therefrom, with portable control devices 69, 70 at their free ends.

As shown in Fig. 7, after the movers 60, 61 are in place under the landing gear 62, 63, and a portion of the weight of the aircraft is transferred to the movers, the aircraft is maneuvered by energizing the movers independently. The movers may be controlled by a single operator walking behind the aircraft, as shown, or by the pilot operating the control devices 69, 70 from the cockpit of the aircraft.

To move the aircraft straight ahead, the control devices 69, 70 are set to drive the movers 60, 61 at the same speed, while turning may be effected by selectively speeding up or slowing down the separate movers. For sharp turns, the movers may be provided with brake means, not shown, whereby one of the movers may be stopped, to serve as a pivot, while the other mover continues to advance.

When the movers are arranged for dual operation, as shown in Fig. 7, a single tandem control device may be used, if desired, in place of the separate control devices 69, 70, as illustrated.

Figure 4:
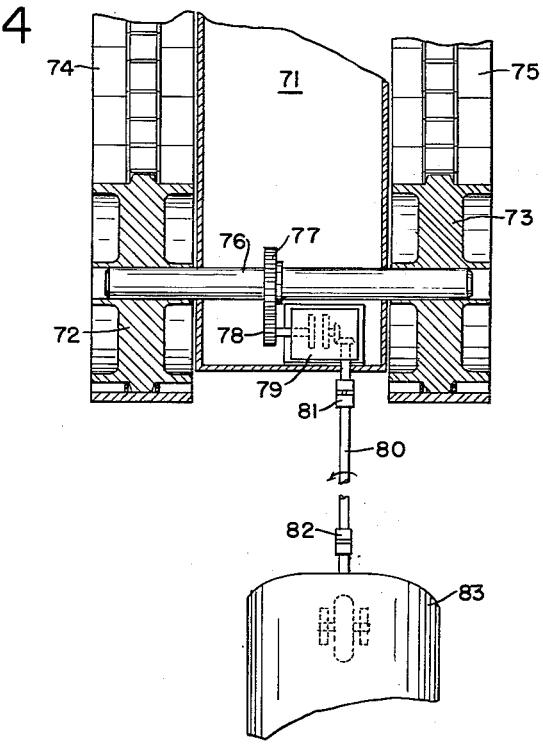
Fig. 4 is a fragmentary cross-sectional view of a modified form of the mover of Fig. 1.

In Fig. 4, there is shown a modified form of the mover of Figs. 1–3, wherein a direct driving connection is provided between the mover and the auxiliary vehicle. Thus, the mover of Fig. 4 has a frame 71, mounting driving sprockets 72, 73, about which are entrained treads 74, 75. The sprockets 74, 75 are supported by an axle 76 mounting a gear 77. The gear 77 is driven by a pinion 78 carried by the output shaft of a hydraulic transmission 79 or other suitable drive device.

Driving power is supplied to the transmission 79 by means of an elongated drive shaft 80 connected through universal joints 81, 82 with the transmission and with the power output of an auxiliary vehicle 83. The auxiliary vehicle 83 has suitable engine means, not shown, for rotating the shaft 80.

Except in the matters specified, the mover of Fig. 4 may be similar to that of Figs. 1–3, and the manner of its use will be generally similar.

It will be understood that various other driving arrangements, of either the direct or indirect type, may be provided for motivating the movers.

Figure 8:
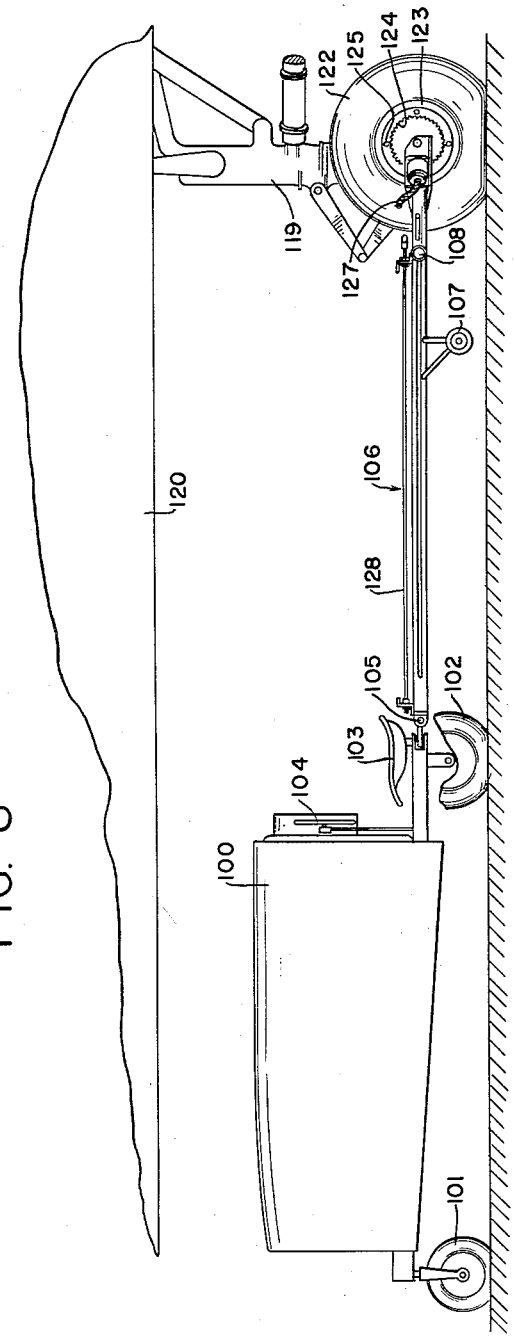
Fig. 8 is a side elevation of a second form of the new mover.
Figure 9:
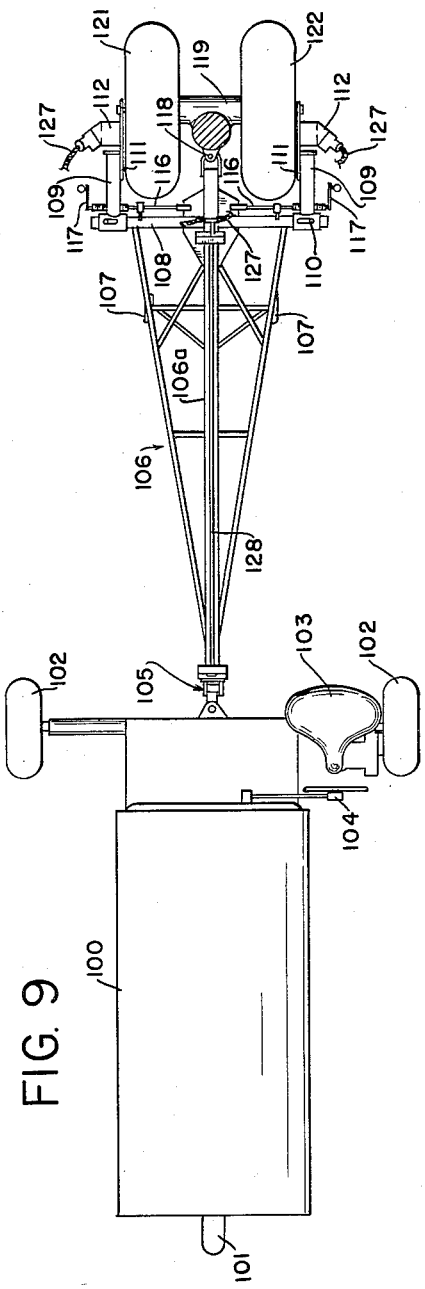
Fig. 9 is a top plan view of the ground mover of Fig. 8.

In the form of the invention shown in Figs. 8–11, the mover is utilized to apply rotative tractive power directly to the wheels of the aircraft, thereby utilizing that portion of the weight of the aircraft supported by the driven wheels to obtain the necessary tractive engagement with the ground surface. Referring now to Figs. 8 and 9, the numeral 100 designates a vehicle movably carried by wheels 101, 102 and carrying suitable engine and hydraulic pump means, not specifically shown. The vehicle 100 is provided with a seat 103 and suitable controls 104 so that it may be driven about with convenience.

Attached to the vehicle 100, by means of a universal connector 105, is an elongated frame 106 having wheels 107 near its outer end enabling it to be carried about behind the vehicle 100 in the same manner as a conventional trailer. At its outer or rearward end, the frame 106 has a crossbar 108 having end portions projecting outwardly of each side of the frame. Slidably received on the opposite end portions of the crossbar 108 are supports 109, which extend rearwardly from the crossbar. The supports 109 are adapted for slidable movement longitudinally of the crossbar 108, while being locked against rotation thereon by means of pins 110.

Figure 10:
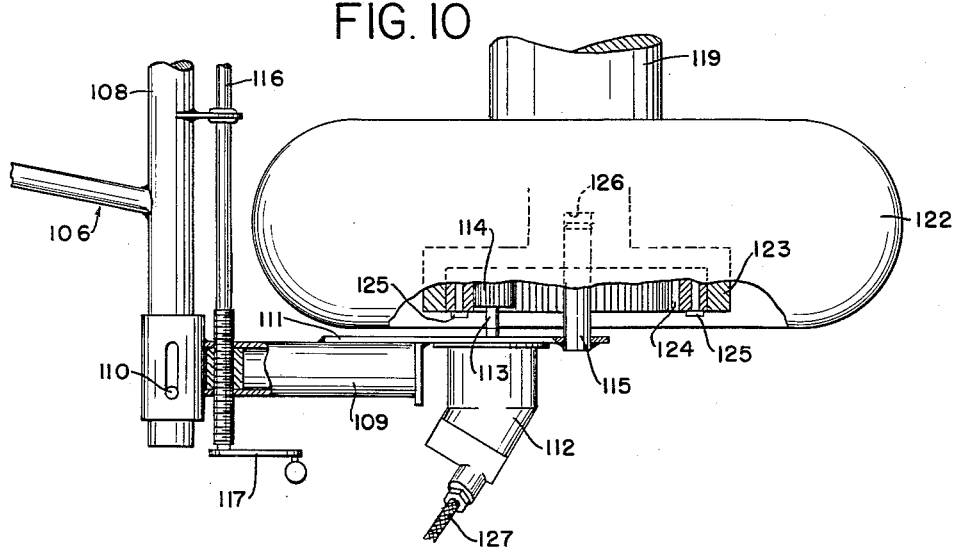
Fig. 10 is an enlarged fragmentary view, with parts broken away, showing the manner in which the mover of Fig. 8 is operatively attached to an aircraft or other vehicle.
Figure 11:
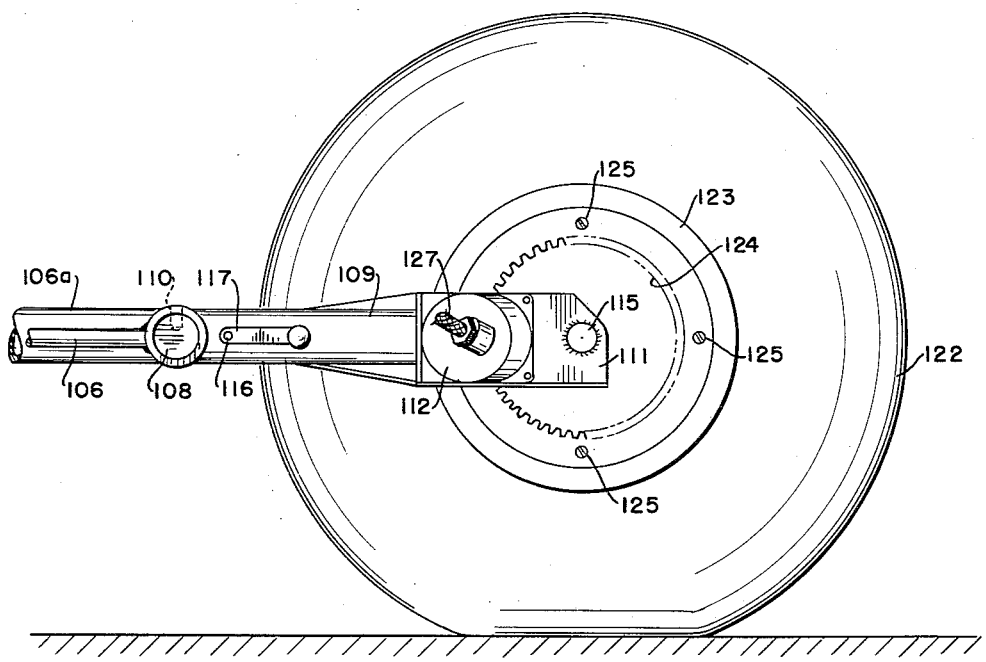
Fig. 11 is an enlarged fragmentary elevation of the apparatus of Fig. 10.

Rigidly secured to the free ends of the supports 109 are mounting plates 111 which extend rearwardly of the supports 109 and mount hydraulic motors 112. The motors 112 may be of a more or less conventional type, and are so mounted on the plates 111 that the drive shafts 113 of the motors project through the mounting plates and toward each other. At the end of each drive shaft 113 is mounted a drive pinion 114, substantially as shown in Fig. 10. Also rigidly secured to the plates 111, adjacent the hydraulic motors 112, are pins 115 which project inwardly of the plates 111, in parallel relation to the crossbar 108.

To control the position of each support 109 with respect to the crossbar 108, shafts 116 are carried by the crossbar 108 and arranged to have threaded engagement with the supports 109. Each of the shafts 116 has a crank 117 at its outer end adapted to be operated manually. The shafts 116 are freely rotatable, but are anchored to the frame 106, so that rotation of the shafts 116 will cause the supports 109 to be moved inwardly or outwardly along the crossbar 108.

As shown in Fig. 9, the frame 106 has a longitudinal member 106a which projects rearwardly of the crossbar 108 and carries a suitable universal connector 118 by means of which the frame 106 may be secured to the landing gear 119 of an aircraft 120.

In the illustrated arrangement, the landing gear 119 is of the type including a pair of spaced wheels 121, 122. As shown best in Fig. 10, each of the wheels 122 is provided with a modified hub 123 having a large diameter cylindrical recess for the reception of a ring gear 124. The gear 124, in its illustrated form, is an annular member having internal teeth and having a plurality of circumferentially spaced axial bores for the reception of pins or bolts 125. The pins 125 are used to removably secure the gears 124 in fixed relation to the wheels 122. The modified hubs 123 are also provided with small-diameter recesses 126 aligned along the axes of rotation of the wheels 122 and adapted to receive the pins 115 secured to the mounting plates 111.

To utilize the instant form of the mover, the vehicle 100 is maneuvered into place in front of the landing gear 119 of the aircraft, in a position where the main beam 106a of the frame 106 can be attached to the landing gear. In this respect, it will be understood that the beam 106a and universal connector 118 may be of lightweight construction, since the tractive effort for moving the aircraft 120 is not applied through the beam.

When the beam 106a is properly coupled with the landing gear 119, the cranks 117 are rotated in a direction to move the supports 109 toward the respective wheels 121, 122. As the supports 109 move inwardly, the pins 115 enter the small-diameter recesses 126 in the hubs 123 of the wheels 121, 122, so that the mounting plates 111 become engaged with the wheels. At the same time, the driving pinions 114 of the hydraulic motors 112 are moved axially toward the wheels and into meshing engagement with the gears 124 carried thereby.

When the hydraulic motors 112 are thus drivingly engaged with the wheels 121, 122, the motors 112 are energized through fluid lines 127 leading to the vehicle 100 through conduits 128 carried on the frame 106. The motors 112 apply driving torque directly to the wheels 121, 122 to affect the rotation thereof. Sufficient traction is developed between the wheels and the ground surface to move the aircraft, since a substantial portion of the weight of the aircraft is supported directly on the landing gear.

When the aircraft is moved into a desired position, the moving device may be disengaged therefrom by rotating the cranks 117 in a reverse direction to move the pinions 114 out of driving engagement with the gears 124, and to withdraw the pins 115 from the hubs 123. The vehicle 100 may then be driven off for use in moving other aircraft. Or, if desired, the vehicle 100 may be detached from the frame 106, leaving the latter attached to the aircraft.

The new mover, in any of the illustrated forms, is of lightweight and compact construction. In all forms of the invention the weight of the aircraft itself is utilized to provide sufficient tractive engagement with the ground surface to move the plane at the desired rate of speed, while the mover itself provides the power facilities to generate the necessary tractive effort. The invention is used to great advantage in the moving of large aircraft, since the size and weight of the new apparatus may be but a small fraction of that required in conventional towing vehicles. For example, the moving of a 100,000 pound aircraft at efficient speeds (2½–5 m.p.h.) requires a conventional vehicle weighing approximately 45,000 pounds to obtain sufficient frictional engagement with the ground surface for exerting the necessary tractive effort through the wheels of the conventional vehicle. On the other hand, apparatus of the type described herein, weighing less than 300 pounds, obtains sufficient tractive engagement with the ground by utilizing a substantial portion of the weight of the aircraft itself. Thus, when the movers are not in use, they may be easily handled and transported from place to place, by air if desired.

Another advantage of the new apparatus is that it is of an inexpensive and especially simplified construction providing for easy maintenance and replacement of worn and broken parts. The mover is thus ideally suited for military field use, where efficient maintenance with a minimum of special equipment is an important factor.

In connection with the moving of aircraft of the type having spaced landing gear, the mover of the type shown in Figs. 1–4 is particularly advantageous, and in accordance with the method of the invention a pair of such movers, supporting a portion of the weight of the aircraft, may be independently controlled to maneuver the aircraft in an efficient and expeditious manner.

It should be understood, however, that the apparatus herein illustrated is intended to be representative only, as certain changes may be made therein without departing from the clear teachings of the invention. Reference should therefore be made to the following appended claim in determining the full scope of the invention.

I claim:

A lightweight tractor for engaging a wheel axle of a heavy aircraft or the like for moving the aircraft over the ground, comprising a frame, forward and aft pairs of sprocket wheels rotatably mounted on said frame with one of said pairs of wheels being the driving pair, a pair of endless tracks disposed on opposite sides of said frame with each of said tracks extending between and operatively engaging a forward and aft of said sprocket wheels, axle engaging means centrally located on said frame and arranged to transfer onto said tractor a portion of the weight of the aircraft to be moved so that said tracks will have substantial gripping engagement with the ground over a broad area, said axle engaging means including a hydraulically operated jack, and a shoe member operatively disposed on an upper portion of said jack for engaging the wheel axle of an aircraft to be moved, means for positively securing said shoe to said wheel axle, means for propelling said tractor over the ground comprising a drive shaft operatively connected with said pair of driving wheels, hydraulic actuator means connected in driving engagement with said drive shaft for controlling the speed and direction of rotation thereof, means intermediate said drive shaft and said driving pair of wheels for selectively controlling the driving effort directed so that either of said driving wheels may be selectively disengaged from said driving wheels to bring about the stalling of a track and hence a turning tendency of said tractor, control means for said tractor including a control cable having a handle at one end and adapted to be held by an operator, means on said handle for controlling the operating speed of said actuator means and hence the speed of said tractor over the ground, said handle also having means for controlling said means intermediate said drive shaft and driving pair of wheels for enabling the operator to selectively stall said tracks, and hydraulic pressure supplying means separate from and towed by said tractor for supplying hydraulic fluid under pressure for use by said hydraulic jack and said actuators.

References Cited in the file of this patent

UNITED STATES PATENTS

| | | |
|---|---|---|
| 901,493 | Stephens | Oct. 20, 1908 |
| 1,187,429 | Houghton | June 13, 1916 |
| 1,309,053 | Adams | July 8, 1919 |
| 1,356,945 | Tunison | Oct. 26, 1920 |
| 1,578,883 | Estes | Mar. 30, 1926 |
| 1,587,083 | Neuzerling | June 1, 1926 |
| 1,806,095 | Sullivan | May 19, 1931 |
| 2,362,991 | Dahl | Nov. 21, 1944 |
| 2,366,892 | Donnellan | Jan. 9, 1945 |
| 2,409,552 | Donnellan | Oct. 15, 1946 |
| 2,411,061 | Saxon | Nov. 12, 1946 |
| 2,539,010 | Cox | Jan. 23, 1951 |
| 2,732,088 | Arnot | Jan. 24, 1956 |
| 2,751,990 | Finlay et al. | June 26, 1956 |
| 2,846,018 | Puckett | Aug. 5, 1958 |

FOREIGN PATENTS

| | | |
|---|---|---|
| 623,360 | Germany | Dec. 19, 1935 |